United States Patent
Spraggins et al.

(10) Patent No.: US 11,115,327 B2
(45) Date of Patent: Sep. 7, 2021

(54) METHODS, SYSTEMS, AND COMPUTER READABLE MEDIA FOR PROVIDING MOBILE DEVICE CONNECTIVITY

(71) Applicant: Oracle International Corporation, Redwood Shores, CA (US)

(72) Inventors: Todd Spraggins, Dallas, TX (US); Ajay Padmakar Deo, Carrollton, TX (US); Thomas Matthew McCann, Raleigh, NC (US); Sam Eric McMurry, Richardson, TX (US); Steven Robert Donovan, Dallas, TX (US); Rajat Gopal, Shrewsbury, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 122 days.

(21) Appl. No.: 16/402,214

(22) Filed: May 2, 2019

(65) Prior Publication Data
US 2020/0067831 A1 Feb. 27, 2020

Related U.S. Application Data

(60) Provisional application No. 62/722,635, filed on Aug. 24, 2018.

(51) Int. Cl.
*H04L 12/28* (2006.01)
*H04L 12/715* (2013.01)
(Continued)

(52) U.S. Cl.
CPC .............. *H04L 45/64* (2013.01); *H04L 41/12* (2013.01); *H04W 84/20* (2013.01)

(58) Field of Classification Search
CPC ..... H04L 45/64; H04L 41/12; H04L 63/0892; H04L 41/0806; H04L 41/0823;
(Continued)

(56) References Cited

U.S. PATENT DOCUMENTS 9,455,778 B1 * 9/2016 Wang .................. H04B 10/032
10,362,507 B2 * 7/2019 Dao .................. H04W 28/0268
(Continued)

FOREIGN PATENT DOCUMENTS

| EP | 2 963 866 A2 | 1/2016 |
|---|---|---|
| WO | WO 2020/040957 | 2/2020 |

OTHER PUBLICATIONS

Notification of Transmittal of the International Search Report and the Written Opinion of the International Searching Authority, or the Declaration for International Application No. PCT/US2019/044435 (dated Oct. 10, 2019).

(Continued)

*Primary Examiner* — Stephen M D Agosta
(74) *Attorney, Agent, or Firm* — Jenkins, Wilson, Taylor & Hunt, P.A.

(57) ABSTRACT

Methods, systems, and computer readable media for providing mobile device connectivity are disclosed. A system includes a mobile gateway implemented on one or more processors. The mobile gateway includes an on-premises telecommunications network core configured for establishing mobile data sessions for mobile user devices and enabling communication between the mobile user devices through the on-premises telecommunications network core. The mobile gateway includes a software-defined wide-area network (SD-WAN) controller configured for establishing an SD-WAN overlay network for connecting the mobile user devices to an external telecommunications network.

6 Claims, 6 Drawing Sheets

(51) Int. Cl.
  *H04L 12/24* (2006.01)
  *H04W 84/20* (2009.01)
(58) Field of Classification Search
  CPC ........... H04L 41/0853; H04L 41/0886; H04W
        84/20; H04W 12/06; H04W 12/0609;
        H04W 4/70; H04W 84/042; H04W 8/22;
        H04W 92/06; H04W 12/0602; H04M
        15/04; H04M 15/06; H04M 15/61; H04M
        15/66; H04M 15/68; H04M 15/80; H04M
              15/8214; G06F 13/00; G06F 13/128
  See application file for complete search history.

(56) References Cited

U.S. PATENT DOCUMENTS

| | | | | |
|---|---|---|---|---|
| 10,420,016 B2 * | 9/2019 | Ryu | ........................ | H04W 4/16 |
| 10,448,239 B2 * | 10/2019 | Faccin | .................... | H04W 8/08 |
| 10,524,166 B2 * | 12/2019 | Youn | ..................... | H04W 8/02 |
| 2004/0083287 A1 * | 4/2004 | Gao | ...................... | H04L 47/824 |
| | | | | 709/226 |
| 2006/0274760 A1 * | 12/2006 | Loher | ..................... | H04L 65/80 |
| | | | | 370/395.52 |
| 2007/0217436 A1 * | 9/2007 | Markley | .......... | H04N 21/43632 |
| | | | | 370/401 |
| 2009/0197597 A1 * | 8/2009 | Kotecha | ................ | H04W 8/082 |
| | | | | 455/433 |
| 2011/0222549 A1 * | 9/2011 | Connelly | ............ | H04L 12/2836 |
| | | | | 370/401 |
| 2012/0320827 A1 * | 12/2012 | Zhao | ..................... | H04W 76/20 |
| | | | | 370/328 |
| 2015/0085663 A1 | 3/2015 | McMurry et al. | | |
| 2015/0142940 A1 | 5/2015 | McMurry et al. | | |
| 2015/0149656 A1 | 5/2015 | McMurry et al. | | |
| 2015/0215228 A1 | 7/2015 | McMurry | | |
| 2015/0381493 A1 * | 12/2015 | Bansal | ................... | H04L 45/745 |
| | | | | 370/392 |
| 2016/0065465 A1 * | 3/2016 | Kennedy | .................. | H04L 47/31 |
| | | | | 370/392 |
| 2016/0218947 A1 * | 7/2016 | Hughes | ............... | H04L 12/2854 |
| 2016/0315809 A1 | 10/2016 | McMurry et al. | | |
| 2017/0048190 A1 | 2/2017 | McCann | | |
| 2017/0048703 A1 | 2/2017 | McCann | | |
| 2017/0048704 A1 | 2/2017 | McCann | | |
| 2017/0085486 A1 | 3/2017 | Chung et al. | | |
| 2017/0155590 A1 * | 6/2017 | Dillon | ................. | H04L 41/5025 |
| 2017/0289027 A1 * | 10/2017 | Ratnasingham | ........ | H04L 45/42 |
| 2017/0324629 A1 * | 11/2017 | Iyer | ...................... | H04L 65/4092 |
| 2017/0332421 A1 * | 11/2017 | Sternberg | .......... | H04W 12/0602 |
| 2017/0345281 A1 * | 11/2017 | Shaw | .................. | H04L 41/0681 |
| 2018/0123932 A1 * | 5/2018 | Shaw | .................. | H04L 43/0876 |
| 2018/0139670 A1 * | 5/2018 | Shaw | ................. | H04W 36/0061 |
| 2018/0159758 A1 * | 6/2018 | Waizel | ................ | H04L 61/2038 |
| 2018/0167983 A1 * | 6/2018 | Salkintzis | ............... | H04W 8/22 |
| 2018/0227223 A1 * | 8/2018 | Hughes | .................. | H04L 69/22 |
| 2018/0249281 A1 | 8/2018 | McCann | | |
| 2018/0249282 A1 | 8/2018 | McCann | | |
| 2018/0317121 A1 * | 11/2018 | Liao | ...................... | H04L 45/38 |
| 2018/0343316 A1 * | 11/2018 | Meyer | ................. | H04L 67/2809 |
| 2019/0036813 A1 * | 1/2019 | Shenoy | ................. | H04L 41/5019 |
| 2019/0036816 A1 * | 1/2019 | Evans | ................. | H04L 41/0896 |
| 2019/0058533 A1 * | 2/2019 | Ghosh | .................. | H04B 17/309 |
| 2019/0274072 A1 * | 9/2019 | Prasad | .............. | H04W 36/0077 |
| 2019/0313359 A1 * | 10/2019 | Lee | ........................ | H04W 76/14 |

OTHER PUBLICATIONS

"Oracle Communications Session Border Controller", Oracle, pp. 1-9 (2015).

* cited by examiner

METHODS, SYSTEMS, AND COMPUTER READABLE MEDIA FOR PROVIDING MOBILE DEVICE CONNECTIVITY

PRIORITY CLAIM

This application claims the benefit of U.S. Provisional Patent Application Ser. No. 62/722,635, filed Aug. 24, 2018, this disclosure of which is incorporated herein by reference in its entirety.

TECHNICAL FIELD

The subject matter described herein relates to methods and systems for providing mobile device connectivity. More particularly, the subject matter described herein relates to methods, systems, and computer readable media for mobile device anchoring with software-defined wide-area network (SW-WAN) overlay.

BACKGROUND

The 3rd Generation Partnership Project (3GPP) is a collaboration between groups of telecommunications standards associations. The 3GPP defined mobile phone system specifications for telecommunications networks including 3G, 4G, and Long Term Evolution (LTE) networks. The next generation network for 3GPP is the 5G network. The 56G specifications target high data rates, reduced latency, energy saving, cost reduction, higher system capacity, and increasing numbers of connected devices.

Mobility in some conventional networks relies on one centralized anchor point which requires all traffic to ingress and egress through that anchor point. Some systems include solutions to distribute the user plane, but these solutions typically are implemented with static connectivity, which can be costly.

Multiprotocol label switching (MPLS) links, for example, can be costly and are increasingly oversubscribed. MPLS has been widely used by service providers and enterprises to build wide area networks (WANs). MPLS resides between layers 2 and 3 and supports multiple transports. An MPLS device at the edge of a network receives incoming packets and does route lookups. The MPLS device determines, for a packet, a complete path to the destination and appends the path to the packet so subsequent devices can forward the packet while avoiding additional routing lookups. The use of the Internet, however, can be unreliable and often congested.

Accordingly, there exists a need for methods, systems, and computer readable media for providing mobile device connectivity.

SUMMARY

Methods, systems, and computer readable media for providing mobile device connectivity are disclosed. A system includes a mobile gateway implemented on one or more processors. The mobile gateway includes an on-premises telecommunications network core configured for establishing mobile data sessions for mobile user devices and enabling communication between the mobile user devices through the on-premises telecommunications network core. The mobile gateway includes a software-defined wide-area network (SD-WAN) controller configured for establishing an SD-WAN overlay network for connecting the mobile user devices to an external telecommunications network.

A method includes, at a mobile gateway implemented on one or more processors, establishing, using an on-premises telecommunications network core of the mobile gateway, mobile data sessions for a plurality of mobile user devices and enabling communication between the mobile user devices through the on-premises telecommunications network core. The method includes establishing, using a software-defined wide-area network (SD-WAN) controller, an SD-WAN overlay network for connecting the mobile user devices to an external telecommunications network.

In some examples, the mobile gateway comprises a session border controller (SBC). The SBC can be configured for controlling telecommunications control plane signaling at an edge between an on-premises access network and a remote system comprising a centralized controller.

In some examples, the SD-WAN controller is configured for establishing a tunnel over a data communications network with a remote system comprising a services gateway, and the mobile gateway is configured for exchanging controlling signaling with the remote system over the tunnel to establish the mobile data sessions.

In some examples, the mobile gateway is configured for providing quality of service (QoS) and route optimization for the mobile user devices using the SD-WAN overlay network. Providing QoS and route optimization for the mobile user devices using the SD-WAN overlay network can include prioritizing the mobile data sessions and re-routing the mobile data sessions over the SD-WAN overlay network to maintain QoS according to prioritizing the mobile data sessions.

In some examples, the on-premises telecommunications core comprises a packet data network (PDN) gateway (PGW). The on-premises telecommunications core can include an evolved packet core (EPC) comprising a mobility management entity (MME), a serving gateway (SGW), a home subscriber server (HSS), and an access network discovery and selection function (ANDSF).

In some examples, the on-premises telecommunications core comprises a 5G core comprising an access management function (AMF), a session management function (SMF), and a user plane function (UPF). The SD-WAN controller can be configured to collaborate with the SMF to manage mobile connectivity control and policy.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The subject matter described herein relates to methods and systems for providing mobile device connectivity. More particularly, the subject matter described herein relates to methods, systems, and computer readable media for mobile device anchoring with software-defined wide-area network (SW-WAN) overlay.

A system can provide quality of service (QoS) and routine optimization for mobile user equipment via one or more mobile gateways which are connected to one another and/or to private networks and/or to public networks (e.g., the Internet) with a policy driven and dynamic SD-WAN overlay. The system can be used to enable the use of inexpensive connectivity when, e.g., a carrier or enterprise establishes a mobile network. The system can also be used, e.g., for local, enterprise, or network aware policies to be used to make mobility and quality decisions on routing mobile data flows.

In operation, establishment of standard mobile data sessions can be enhanced to utilize direct knowledge of the SD-WAN overlay network that connects the mobile gateway to determine optimal anchoring and ingress/egress to private or public networks. The SD-WAN overlay network can be driven by policies which are dynamic in nature to account for QoS requirements.

Figure 1A:
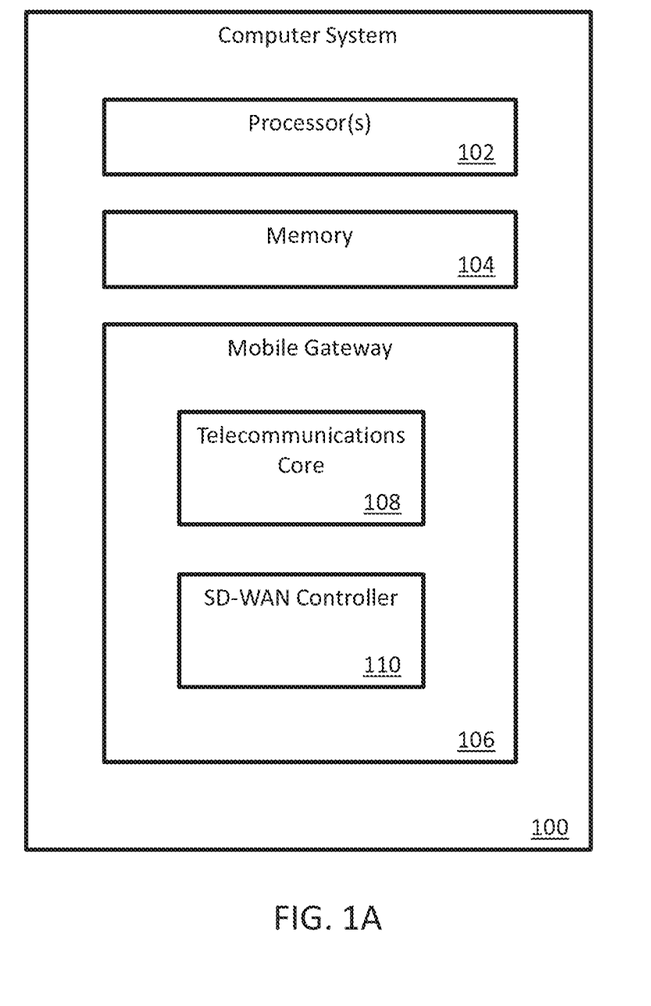
FIG. 1A is a block diagram of an example computer system for providing mobile device connectivity.

FIG. 1A is a block diagram of an example computer system 100 for providing mobile device connectivity. The system 100 includes one or more processors 102 and memory 104 storing instructions for the processors 102.

The system 100 includes a mobile gateway 106 implemented on processors 102. The mobile gateway 106 includes an on-premises telecommunications network core 108 configured for establishing mobile data sessions for mobile user devices and enabling communication between the mobile user devices through the on-premises telecommunications network core 108. The mobile gateway 106 also includes a software-defined wide-area network (SD-WAN) controller configured for establishing an SD-WAN overlay network for connecting the mobile user devices to an external telecommunications network.

SD-WAN can operate as a service that enables enterprises to dynamically route traffic across a hybrid WAN based on current network status. Instead of using conventional routers, SD-WAN can assess and utilize different transport technologies based on their performance, which can enable enterprises to route large portions of their traffic over cost-effective services. SD-WAN can be deployed with WAN edge devices placed at branch sites, and the devices can be centrally managed, with routing based on application policies and security rules that can be updated as network requirements change.

In some examples, the mobile gateway 106 is a session border controller (SBC) or includes an SBC. For example, an SBC can be configured for controlling telecommunications control plane signaling at an edge between an on-premises access network and a remote system comprising a centralized controller. The SBC can enable service providers to deliver real-time communications services across Internet Protocol (IP) network borders by offering functions for security, interoperability, reliability and quality, regulatory compliance, and revenue/cost optimization.

The SD-WAN controller 110 can be configured for establishing a tunnel over a data communications network with a remote system comprising a services gateway. Then, the mobile gateway 106 can be configured for exchanging controlling signaling with the remote system over the tunnel to establish the mobile data sessions.

In some examples, the mobile gateway 106 is configured for providing QoS and route optimization for the mobile user devices using the SD-WAN overlay network. Providing QoS and route optimization for the mobile user devices using the SD-WAN overlay network can include prioritizing the mobile data sessions and re-routing the mobile data sessions over the SD-WAN overlay network to maintain QoS according to prioritizing the mobile data sessions.

The on-premises telecommunications core 108 can include, e.g., a packet data network (PDN) gateway (PGW). In some examples, the on-premises telecommunications core 108 includes a full core network, e.g., an evolved packet core (EPC). An EPC can include system components such as a mobility management entity (MME), a serving gateway (SGW), a home subscriber server (HSS), and an access network discovery and selection function (ANDSF). In some examples, the on-premises telecommunications core 108 includes a 5G core comprising an access management function (AMF), a session management function (SMF), and a user plane function (UPF). The SD-WAN controller 110 can be configured to collaborate with the SMF to manage mobile connectivity control and policy.

Figure 1B:
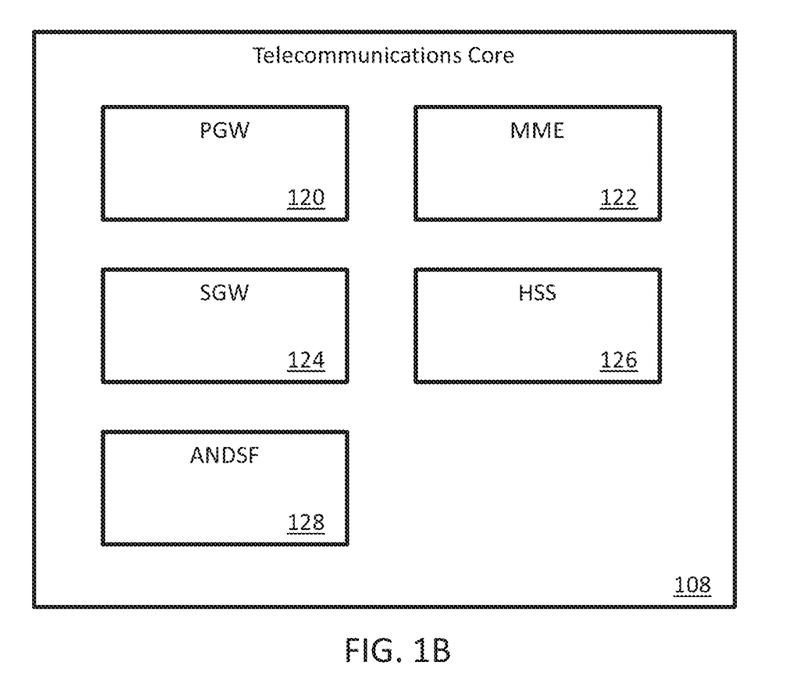
FIG. 1B is a block diagram of an example telecommunication core that includes an EPC.

FIG. 1B is a block diagram of an example telecommunication core 108 that includes an EPC. The telecommunications core 108 includes a PGW 120, an MME 122, an SGW 124, an HSS 126, and an ANDSF 128.

The PGW 120 is configured for providing access to the Internet, an Internet protocol multimedia subsystem (IMS) network, or other data networks. For example, The PGW 120 may communicate with the SGW 124 to provide communications with an application function (AF) server or other server.

In some examples, the PGW 120 includes a policy and charging enforcement function (PCEF) and may manage and enforce policy and charging control (PCC) rules provided by a policy and charging rules function (PCRF). For example, PCC rules may be provided for each service data flow (e.g., one or more packet flows that match certain criteria, such as a subscriber-based media traffic flow) and/or user equipment attempting to use the PGW 120.

The MME 122 is configured to act as the primary control node for a radio access network (e.g., a long term evolution (LTE) access network) and for assisting with bearer activation/deactivation processing and the initial attachment stage. The MME 122 can be configured to generate create session request messages in response to receiving corresponding session setup request messages originating from user equipment. After generating the creation request message, the MME 120 may be configured to direct the message to the PGW 120 via the SGW 124.

The SGW 124 is configured for facilitating communications between the access network and other nodes (e.g., The PGW 120) or networks. For example, the SGW 124 may communicate user traffic to other nodes in the telecommunications core 108.

The HSS 126 is a master user database that supports IMS network entities that handle calls and sessions. The HSS 126 can contain user profiles, perform authentication and authorization of users, and can provide information about the physical location of a user.

The ANDSF 128 is configured for assisting user equipment to discover other access networks, e.g., Wi-Fi or WIMAX networks, that can be used for data communications. The ANDSF 128 is also configured for providing user equipment with rules policing the connections to the other access networks.

Figure 1C:
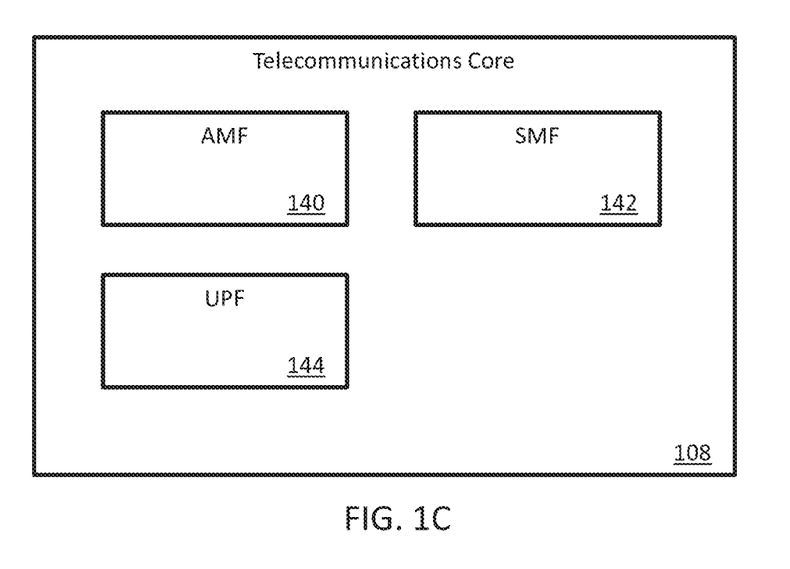
FIG. 1C is a block diagram of an example telecommunication core for a 5G network.

FIG. 1C is a block diagram of an example telecommunication core 108 for a 5G network. The telecommunications core 108 includes an AMF 140, an SMF 142, and a UPF 144.

The 3GPP has defined a service-based architecture for its next generation 5G core network. In a service-based architecture, services are provided to software components by application components, typically through a communication protocol over a data communications network. A service can be, e.g., a discrete function that can be accessed remotely and consumed and updated independently of other services in the system. Different services can be used together to provide the functionality of a larger functional system such as a software application. The service-based architecture can integrate distributed and separately-maintained software components.

The AMF 140 is configured for, e.g., registration management, connection management, reachability manage, and mobility management. The AMF 140 can be configured for various functions relating to security and access management and authorization.

The SMF 142 is configured to support session management, e.g., session establishment, modification, and release. The SMF 142 can be configured to support user equipment IP address allocation and management, dynamic host configuration protocol (DHCP) functions, and termination of signaling related to session management.

The UPF 144 is configured to support packet routing and forwarding, packet inspection, quality of service (QoS) handling. In some examples, the UPF 144 is configured to act as an external session point of interconnect and an anchor point for radio access mobility.

Other examples of 5G network functions include a network slice selection function (NSSF), a network exposure function (NEF), a network function repository function (NRF), a policy control function (PCF), a unified data management (UDM) function, an application function (AF), a security edge protection proxy (SEPP), an authentication server function (AUSF), a bootstrapping server function (BSF).

Figure 2:
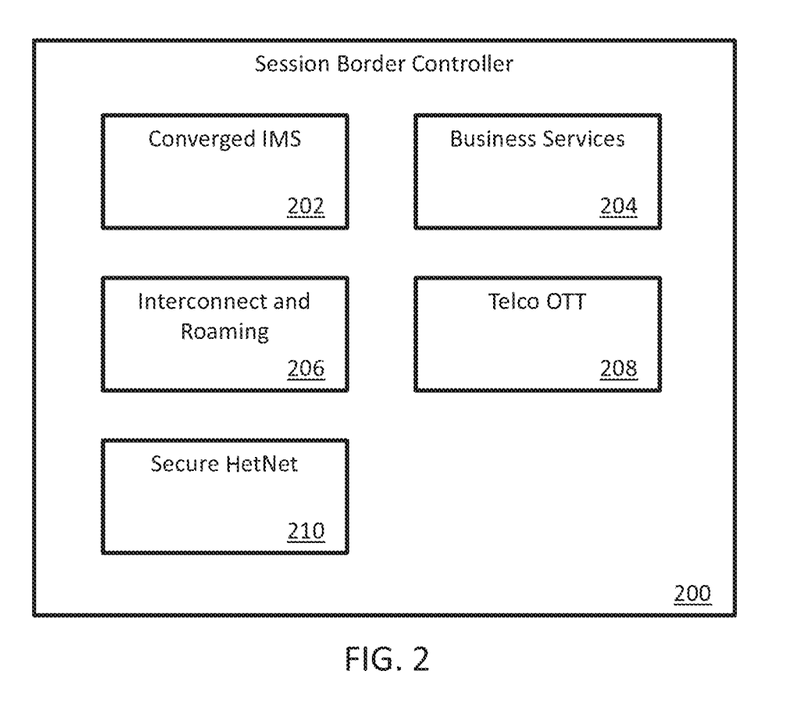
FIG. 2 is a block diagram of an example session border controller 200.

FIG. 2 is a block diagram of an example session border controller 200. The session border controller 200 can be configured to be the mobile gateway 106 of FIG. 1A, e.g., by adding the SD-WAN controller 110 to the session border controller 200.

The session border controller 200 enables service providers to deliver trusted, first-class real-time communications services across IP network borders. The session border controller 200 includes a converged IMS engine 202 for providing services and applications ranging from based Voice over IP (VoIP) to any services enabled by IMS, for example, Voice over LTE (VoLTE), Wi-Fi calling (VoWiFi) video conference and calling, presence, instant messaging, IP television (IPTV), GSM Association's IP Exchange (IPX) and femtocell or Wi-Fi-enabled fixed-mobile convergence. The session border controller 200 provides, for these features, control functions/features, protocol support, programmability, and manageability in various types of IP networks.

The session border controller 200 can include business services 204, for example, session initiation protocol (SIP) trunking, hosted unified communications (UC), and hosted contact center (CC). The session border controller 200 can provide interconnect and roaming functions 206, for example, SIP interconnect, VoLTE roaming, and IPX interconnect. The session border controller 200 can include Telco OTT (Over-The-Top) functions 208 to enable service providers to deliver telecommunications services across an IP network, for example, OTT voice, video, and messaging. The session border controller 200 can include secure heterogeneous network (HetNet) functions 210, for example, small-cell, WiFi offload, and Wi-Fi calling.

In operation, the session border controller 200 is configured to satisfy critical service provider requirements in at least five major areas: security, interoperability, reliability and quality, regulatory compliance, and revenue/cost optimization.

Security

Using a security framework for real-time communications, the session border controller 200 secures service provider access and interconnect/peering borders. In some examples, the tight coupling of the security framework and advanced hardware enables the session border controller 200 to protect itself, the service delivery infrastructure, and communications sessions from a wide range of malicious and non-malicious threats. The session border controller 200 uses the security framework to ensure confidentiality, integrity, and availability of real-time interactive communications services. It preempts attacks, eliminates vulnerabilities, and applies powerful mitigation to counteract events as they happen, while ensuring continuity and high quality for subscribers and operators using the services.

Interoperability

SIP, H.323, and SIP-H.323 interworking capabilities of the session border controller 200 are designed to maximize service reach by ensuring interoperability with and between subscriber endpoints, softswitches, IMS Call Session Control Function (CSCF) elements, application servers, media and recording servers, media gateways, and SBCs in peering networks and SIP/H.323-trunked enterprise networks. The session border controller 200 enables sessions traverse network address translation (NAT)/firewalls, IPv4 or IPv6 networks, public and private networks using overlapping IP addresses, and virtual private networks (VPNs). In some examples, the session border controller 200 mediates between different signaling, transport, and encryption protocols; converts incompatible codecs; and translates signaling-layer telephone numbers, addresses, and response codes.

Reliability and Quality

The session border controller 200 enables service provides in ensuring service availability and user quality of experience. In some examples, the session border controller 200 performs admission control via local policies or external policy servers to ensure that both the network and service infrastructure have the capacity to support high-quality communications. It also monitors and reports actual session quality to determine compliance with performance specifications set forth in service-level agreements (SLAs) between service providers. Intelligent session routing and high-availability configurations minimize outages caused by upstream link failure or equipment problems.

Regulatory Compliance

The session border controller 200 can be configured to support government-mandated regulations worldwide, including national emergency services such as E911, national security emergency preparedness services such as Government Emergency Telecommunications Service (GETS), and lawful intercept as mandated by the U.S. Communications Assistance for Law Enforcement Act (CALEA) as well as similar laws enforced in other countries.

Revenue and Cost Optimization

The session border controller 200 can help service providers control costs and increase revenues with options for integrating many IMS functions—routing sessions optimally to minimize costs, providing accounting and related mechanisms to maximize billable sessions, and protecting against theft of bandwidth and quality of service (QoS). The session border controller 200 can be configured to provide the performance, capacity and throughput needed for various types and sizes of service provider. In some examples, the session border controller 200 leverages state-of-the-art hardware with symmetrical multiprocessing across a purpose-built platform family, so that the session border controller 200 can scale to support up to one million subscribers on a single chassis, and it can support massively scalable access networks operating in an SBC cluster, e.g., controlled by a load balancer.

The session border controller 200 can be configured as an Access SBC (A-SBC), Interconnect SBC (I-SBC), or both roles simultaneously depending on service requirements. In some examples, the flexibility of the session border controller 200 extends to smaller service providers wishing to consolidate access and interconnect functionality in a single system. The session border controller 200 can integrate a number of standard IMS functions used at access or interconnect borders, simplifying its integration with that next-generation service delivery architecture.

At service provider access borders (the borders facing enterprise locations, as well as public access networks such as the internet, 3G/4G mobile, or fixed line networks used by residential or cable subscribers) the session border controller 200 can enable new service build-out and consolidation of service infrastructure. In some examples, the session border controller 200 protects the service delivery infrastructure from malicious and equally dangerous non-malicious threats while maximizing service reach, reliability, and user quality of experience.

At interconnect borders (the borders between service provider networks), the session border controller 200 can be used to accelerate initial offering or expansion of next-generation IMS or IP services, which helps drive down time-division multiplexing (TDM) costs and expand service provider partnerships. The session border controller 200 can deliver key functions for service provider interconnects such as highly scalable and flexible routing as well as hardware-accelerated security and transcoding.

In some examples, the session border controller 200 is based on Acme Packet OS, which delivers comprehensive multiprotocol signaling, programmability, and control functions and features.

The session border controller 200 can be configured to support commonly used IP signaling protocols including SIP, SIP-I, SIP-T, Diameter, H.323, MGCP, H.248, Message Session Relay Protocol (MSRP), and Real Time Streaming Protocol (RTSP), allowing service providers to extend services to a large number of endpoints, as well as services offered via interconnect borders. Extensive signaling protocol Interworking Function (IWF) allows service providers to consolidate signaling traffic within their networks. This reduces the number of required network elements, simplifies management, and reduces capital and operating expenditures. The session border controller 200 also allows the integration of next-generation SIP with legacy networks and endpoints, maximizing service revenues.

The session border controller 200 can implement SIP to provide interoperability, maturity, and functionality. To normalize session signaling between SIP implementations that often feature vendor-specific messages and response codes, the session border controller 200 can include extensive signaling programmability. This empowers inspection or modification of elements within protocol headers or payload, including information found in SIP, Session Description Protocol (SDP), and Diameter headers.

In some examples, the session border controller 200 implements a full back-to-back user agent (B2BUA) approach that divides each session flowing through the session border controller 200 into discrete segments. In this way, the session border controller 200 can maintain session state with each endpoint simultaneously, empowering the application of a wide range of control functions over the end-to-end session without modification to either the behavior or configuration of either endpoint.

In some examples, the session border controller 200 implements numerous 3GPP-compliant functions and interfaces for seamless IMS integration. The session border controller 200 can also include added capabilities to enhance security, interoperability, and reliability beyond standard IMS requirements.

In some examples, the session border controller 200 provides full IMS functionality at access and interconnect borders to fully control the SIP, Real-time Transport Protocol (RTP), and Message Session Relay Protocol (MSRP) traffic flows that comprise IMS sessions. At IMS access borders, the session border controller 200 can implement signaling and media-related IMS functions such as Proxy Call Session Control Function (P-CSCF), Emergency Call Session Control Function (E-CSCF), Break-out Gateway Control Function (BGCF), Access Gateway (AGW), Access Transfer Control Function (ATCF), and Access Transfer Gateway (ATGW). IMS I-SBC functions include Interconnect Border Control Function (I-BCF), IWF, and Interconnect Border Gateway Function (I-BGF)/Translation Gateway (TrGW).

The universal availability of broadband Internet and the widespread adoption of smartphones and tablets are enabling a new hyper-connected enterprise where employees are always on-line, always collaborating. Some enterprises are implementing remote communications services to improve productivity and collaboration for on-the-go workers. Often referred to as over-the-top (OTT) communications, these services eliminate the telephony-only constraints of cellular services and extend full UC functionality (voice, video, presence and instant messaging) to enterprise operators over mobile data networks. But connectivity obstacles, security concerns or poor service quality can impede OTT rollouts, impair user satisfaction and burden the help desk.

In some examples, Tunnel Session Control Function (TSCF) is an enabling feature on the session border controller 200 configured to mitigate common OTT deployment and operations challenges. TSCF can be useful for a wide variety of OTT communications applications including Bring Your Own Device (BYOD) and fixed-mobile convergence (FMC) initiatives.

When deployed in conjunction with a load balancer, e.g., a subscriber-aware load balancer, the session border controller 200 can also function as a member of an SBC cluster. SBC clusters provide dynamic, adaptive load balancing of subscriber traffic across the cluster, allowing services to scale to support millions of subscribers without architectural forklifts or network disruptions. SBC clusters also deliver enhanced redundancy and manageability not achievable with traditional Layer 3/Layer 5 web load balancers or SIP redirect servers.

In some examples, the session border controller 200 can be run as a Virtual Network Function (VNF). The session border controller 200 can be configured to support any appropriate hypervisor, for example, Oracle Virtual Machine (OVM), Kernel-Based Virtual Machine (KVM), and VMware ESXi. As a VNF, the session border controller 200 may be deployed as a standalone instance or within an orchestrated Network Function Virtualization (NFV) environment, and offers the same level of functionality, security, interoperability, and reliability as it does on purpose-built platforms. Instances of virtualized session border controllers may be clustered with their counterparts on purpose-built platforms, creating what are known as "hybrid clusters," providing a way for their gradual introduction and for even greater deployment flexibility and network agility.

Figure 3:
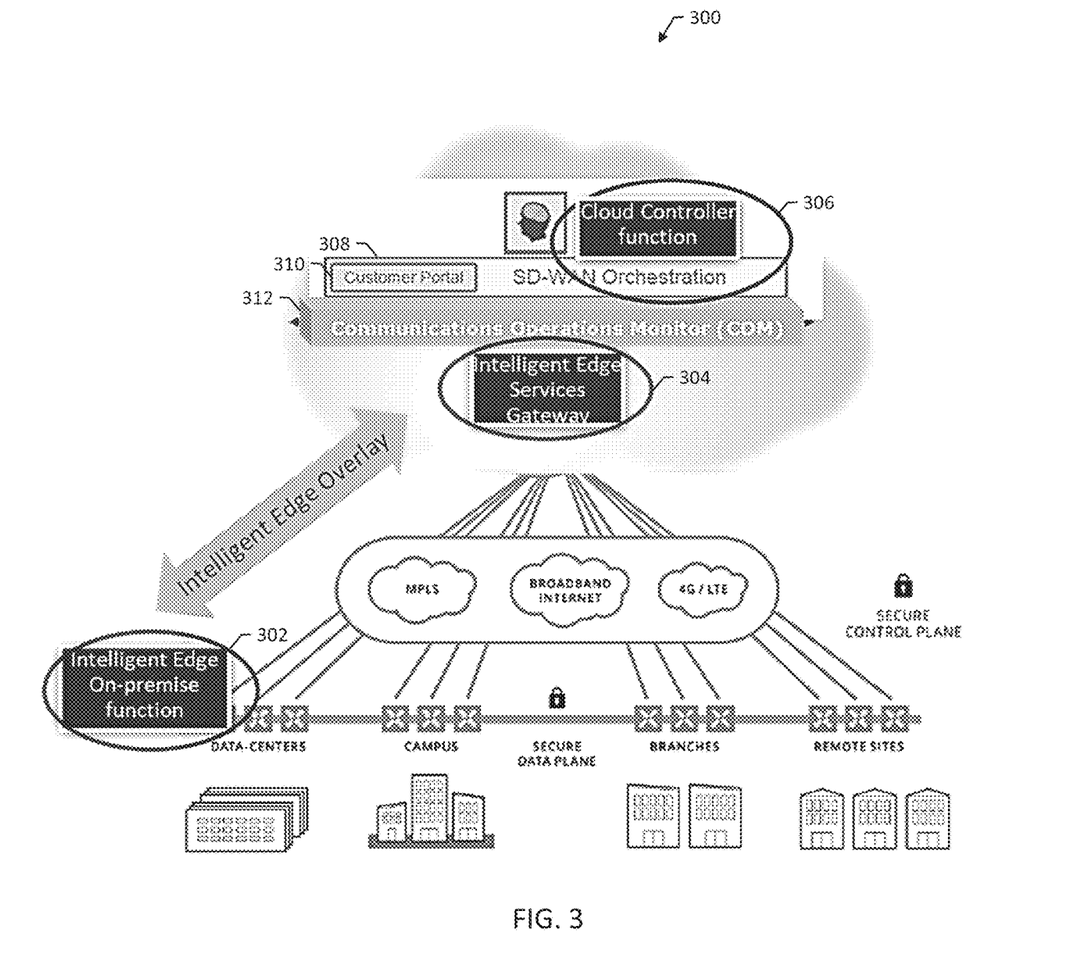
FIG. 3 is a diagram of an example communications environment.

FIG. 3 is a diagram of an example communications environment 300 including the system 100 of FIG. 1. The mobile gateway, as illustrated in FIG. 3, can be referred to as an intelligent edge on-premise function. The SD-WAN overlay can be referred to as an intelligent edge overlay.

Deployment of centralized functions for a core network of a telecommunications network can be deployed in centralized locations, e.g., on a cloud computing system. User plane functions or even entire core networks can be deployed in mobile network operator (MNO) data centers or MNO customer data centers. The systems illustrated in FIG. 3 can be used to leverage the intelligent edge capabilities to deliver traffic optimally across the edge and the core.

The intelligent edge system can have one or more of the following characteristics:
- based on SD-WAN technology
- reduces cost and increases flexibility by making use of public broadband
- addresses the need for enterprise-grade security and quality of service
- maintains application stability and performance with the transition to cloud
- supports business agility with shorter lead time to deploy
- supports progressive transition to uCPE with VNF services with end to end orchestration.

As shown in FIG. 3, one or more mobile gateways can be deployed at various on-premises locations, such as data centers, campuses, branches, and remote sites. FIG. 3 illustrates a mobile gateway 302 as an intelligent edge on-premise function, which can be implemented on the system 100 of FIG. 1.

The intelligent edge overlay can use various types of networks, e.g., MPLS, broadband Internet, and 4G/LTE networks to implement a secure control plane, e.g., for exchanging control messages. The mobile gateway 302 communicates with a remote system via a gateway, which can be referred to as an intelligent edge services gateway 304. The remote system can be, e.g., a cloud computing system including a cloud controller function 306.

The remote system can include an SD-WAN orchestrator 308. The SD-WAN orchestrator 308 can include a customer portal 310, e.g., implemented as a graphical user interface configured for receiving input from service operators for configuring the intelligent edge overlay. The remote system can include a communications operations monitor (COM) 312.

In some examples, the COM 312 is configured to capture signaling messages from the network, using network probes linked to a correlation engine, with the results viewable through a web-architected GUI. Network probes are available as session monitor probes that run on, for example, commercial-off-the-shelf (COTS) hardware and as software components that are integrated into the mobile gateway 302.

The COM 312 can be configured to provide full, end-to-end correlation of calls in real time. It enables network-wide views of calls and registrations as well as global KPIs and statistics, network equipment statistics and information, and user group and trunk information. It offers drill-down into the network, providing diagrammatic call flow analyses with full protocol details, raw capturing, and registrations end to end.

In operation, the SD-WAN orchestrator 308 can provide device management for SD-WAN edges and SD-WAN gateways associated with the SD-WAN orchestrator 308, e.g., the mobile gateway 302 and the intelligent edge services gateway 304. For example, the SD-WAN orchestrator 308 can perform configuration and activation, IP address management, and pushing down policies onto the mobile gateway 302 and the intelligent edge services gateway 304.

In some examples, the SD-WAN orchestrator 308 maintains connections to SD-WAN edges and SD-WAN gateways to identify the operational states of SD-WAN tunnels across different WANs. For examples, the SD-WAN orchestrator 308 can retrieve QoS performance metrics for each SD-WAN tunnel or from each device. The SD-WAN orchestrator 308 can the use the metrics, e.g., for traffic shaping.

In some examples, the SD-WAN orchestrator 308 can perform WAN optimization or can push WAN optimization policies to the mobile gateway 302 and the intelligent edge services gateway 304. WAN optimization can be performed, for example, on TCP flows. WAN optimization can increase efficiency across a WAN, for example, for bulk file-transfer traffic, which can happen when data is requested by multiple users at a same location. WAN optimization can be configured on a per-rule basis and can include performing TCP offload, data deduplication, and compression.

Data compression reduces the payload size to deliver more data across a WAN, enabling unencumbered application delivery and the ability handle more traffic. Data deduplication is a form of compression that eliminates redundant copies of data over the WAN, and reduces storage overhead.

When WAN optimization is enabled for a flow, TCP termination splits a single TCP connection into three separate connections, which can be managed and maintained by the SD-WAN orchestrator 308. This offers maximum bandwidth utilization and reliable data transfer across the WAN. This can also reduce the burden associated with the retransmission of lost packets over the WAN since SD-WAN nodes can be configured to handle retransmisson, resulting in an improved user Quality of Experience (QoE) while freeing resources to handle core functions.

Figure 4:
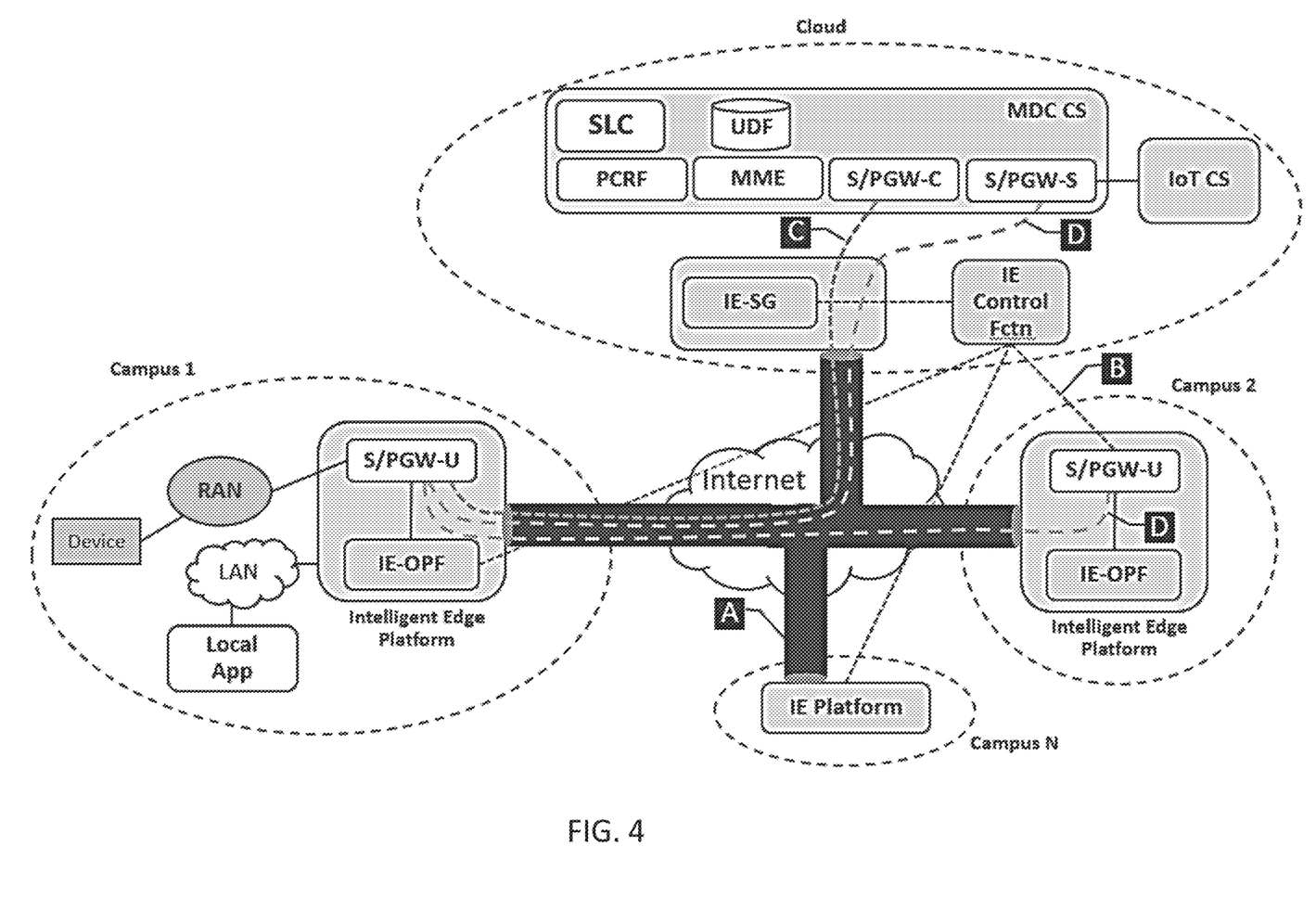
FIG. 4 is diagram illustrating an example communications environment for a telecommunications network.

FIG. 4 is diagram illustrating an example communications environment for a telecommunications network. FIG. 4 illustrates one way to utilize the intelligent edge architecture illustrated in FIG. 3 to support hybrid deployment models. As shown in FIG. 4, the user plane is deployed at the edge of the telecommunications network.

The telecommunications network includes an intelligent edge (IE) control function, which can be implemented on a cloud computing system and configured for centralized administration of the overlay network, policy, route optimization, and the like. The telecommunications network includes, at each of several locations, an IE on-premise function (IE-OPF). Each IE-OPF can be configured for, e.g., link load balancing, packet forwarding, and the link.

The telecommunications network includes an IE services gateway (IE-SG), which can be implemented in the cloud computing system and configured for, e.g., termination of tunnel connections at cloud data centers. The telecommunications network includes an IE edge platform at each of the locations. The IE edge platform hosts an IE-OPF and can also host other core network components, e.g., a PGW.

The traffic flows illustrated in FIG. 4 demonstrate an example of a user plane edge offload. The following example flows are shown in FIG. 4:

Intelligent Edge establishes tunnels (labelled "A") between each IE-OPF and IE-OPFs and IE-SGs by using policy and control from IE Control Function (labelled "B")

Control signaling between S/PGW-C and S/PGW-U establish packet data flows for mobile communications (labelled "C")

Packet data flows can terminate at any S/PGW by utilizing capabilities similar to 3GPP S5 interface, essentially enabling any flow entering a S/PGW to egress at any S/PGW (labelled "D")

Additionally, standard mobility signaling (3GPP S1 interface) can be routed from a radio access network (RAN) through the S/PGW and is then is placed over the IE tunnel back to the cloud to terminate on the MME.

The mobile user device can use any S/PGW-U to reach a destination. For example, the following scenarios are possible:

Device data flows through the ran to the S/PGW-U at campus 1 where it terminates to the local LAN Device data flows through the ran to the S/PGW-U at campus 1 where it terminates to the Internet of Things (IoT) CS via the S/PG-U in the oracle cloud utilizing the IE tunnel between campus 1 and the cloud Device data flows through the ran to the S/PGW-U at campus 1 where it terminates to campus 2 via the S/PGW-U located there utilizing the tunnel between campus 1 and campus 2

For a 5G scenario, the flows remain similar to those depicted but with different functions.

The MME is replaced by the AMF
The S/PGW-C is replaced by the SMF
The S/PGW-U is replaced by the UPF 5G will enable a more distributed mobility framework with UPF chaining, which can be leveraged in this architecture. For example, the SMF can directly collaborate with the IE Controller Function to better manage mobile connectivity control and policy. The UPF can be more tightly integrated or even collapsed with the IE-OPF for steering mobile traffic.

Figure 5:
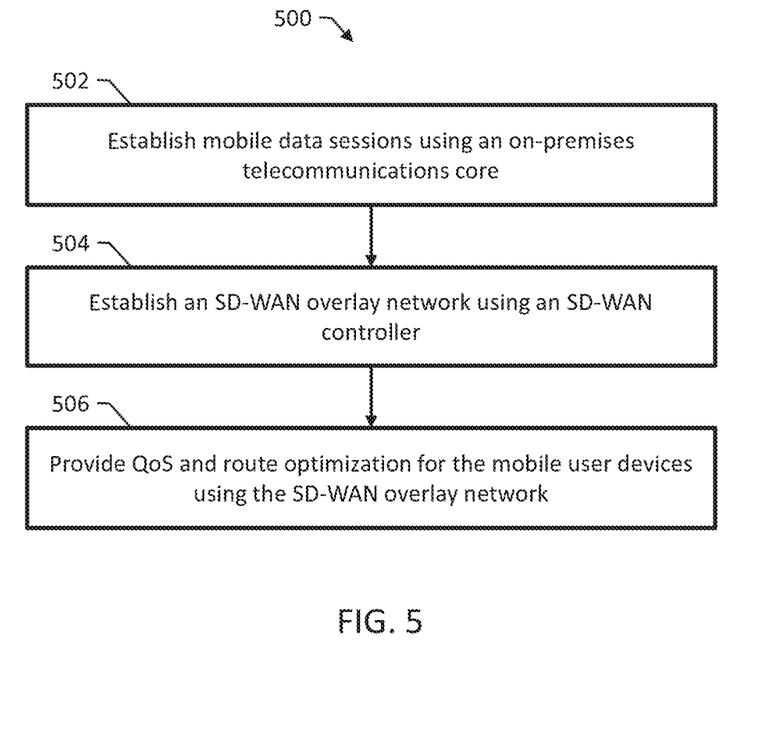
FIG. 5 is a flow diagram of an example method for providing mobile device connectivity.

FIG. 5 is a flow diagram of an example method 500 for providing mobile device connectivity. The method 500 is performed by a mobile gateway implemented on one or more processors, e.g., the mobile gateway 106 of FIG. 1. The mobile gateway can be, e.g., an SBC configured for controlling telecommunications control plane signaling at an edge between an on-premises access network and a remote system comprising a centralized controller.

The method 500 includes establishing, using an on-premises telecommunications network core of the mobile gateway, mobile data sessions for a plurality of mobile user devices and enabling communication between the mobile user devices through the on-premises telecommunications network core (502). The method 500 includes establishing, using a software-defined wide-area network (SD-WAN) controller, an SD-WAN overlay network for connecting the mobile user devices to an external telecommunications network (504).

In some examples, the method 500 includes establishing, using the SD-WAN controller, a tunnel over a data communications network with a remote system comprising a services gateway, and exchanging controlling signaling with the remote system over the tunnel to establish the mobile data sessions.

The method 500 includes providing quality of service (QoS) and route optimization for the mobile user devices using the SD-WAN overlay network (506). Providing QoS and route optimization for the mobile user devices using the SD-WAN overlay network can include prioritizing the mobile data sessions and re-routing the mobile data sessions over the SD-WAN overlay network to maintain QoS according to prioritizing the mobile data sessions.

In some examples, the on-premises telecommunications core comprises a packet data network (PDN) gateway (PGW). The on-premises telecommunications core can include an evolved packet core (EPC) comprising a mobility management entity (MME), a serving gateway (SGW), a home subscriber server (HSS), and an access network discovery and selection function (ANDSF).

The on-premises telecommunications core can, in some examples, include a 5G core comprising an access management function (AMF), a session management function (SMF), and a user plane function (UPF). Then, the method 500 can include collaborating, using the SD-WAN controller, with the SMF to manage mobile connectivity control and policy.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for providing mobile device connectivity, the system comprising:
   one or more processors;
   memory storing executable instructions for the processors; and
   a mobile gateway implemented on the one or more processors, wherein the mobile gateway comprises:
      an on-premises telecommunications network core configured for establishing mobile data sessions for a plurality of mobile user devices and enabling communication between the mobile user devices through the on-premises telecommunications network core, wherein the on-premises telecommunications core comprises a 5G core comprising an access and mobility management function (AMF), a session management function (SMF), and a user plane function (UPF); and a software-defined wide-area network (SD-WAN) controller configured for establishing an SD-WAN overlay network for connecting the mobile user devices to an external telecommunications network;

wherein the mobile gateway comprises a session border controller (SBC), and wherein the SBC is configured for controlling telecommunications control plane signaling at an edge between an on-premises access network and a remote system comprising a centralized controller;

wherein the SD-WAN controller is configured for establishing a tunnel over a data communications network with a remote system comprising a services gateway, and wherein the mobile gateway is configured for exchanging controlling signaling with the remote system over the tunnel to establish the mobile data sessions;

wherein the mobile gateway is configured for providing quality of service (QoS) and route optimization for the mobile user devices using the SD-WAN overlay network, and wherein providing QoS and route optimization for the mobile user devices using the SD-WAN overlay network comprises prioritizing the mobile data sessions and re-routing the mobile data sessions over the SD-WAN overlay network to maintain QoS according to prioritizing the mobile data sessions; and wherein the SD-WAN controller is configured to collaborate with the SMF to manage mobile connectivity control and policy.

2. The system of claim 1, wherein the on-premises telecommunications core comprises a packet data network (PDN) gateway (PGW).

3. The system of claim 2, wherein the on-premises telecommunications core comprises an evolved packet core (EPC) comprising a mobility management entity (MME), a serving gateway (SGW), a home subscriber server (HSS), and an access network discovery and selection function (ANDSF).

4. A method for providing mobile device connectivity, the method comprising:
at a mobile gateway implemented on one or more processors:
establishing, using an on-premises telecommunications network core of the mobile gateway, mobile data sessions for a plurality of mobile user devices and enabling communication between the mobile user devices through the on-premises telecommunications network core, wherein the on-premises telecommunications core comprises a 5G core comprising an access and mobility management function (AMF), a session management function (SMF), and a user plane function (UPF); and establishing, using a software-defined wide-area network (SD-WAN) controller, an SD-WAN overlay network for connecting the mobile user devices to an external telecommunications network;

wherein the mobile gateway comprises a session border controller (SBC), and wherein the SBC is configured for controlling telecommunications control plane signaling at an edge between an on-premises access network and a remote system comprising a centralized controller;

wherein the SD-WAN controller is configured for establishing a tunnel over a data communications network with a remote system comprising a services gateway, and wherein the mobile gateway is configured for exchanging controlling signaling with the remote system over the tunnel to establish the mobile data sessions;

wherein the mobile gateway is configured for providing quality of service (QoS) and route optimization for the mobile user devices using the SD-WAN overlay network, and wherein providing QoS and route optimization for the mobile user devices using the SD-WAN overlay network comprises prioritizing the mobile data sessions and re-routing the mobile data sessions over the SD-WAN overlay network to maintain QoS according to prioritizing the mobile data sessions; and wherein the SD-WAN controller is configured to collaborate with the SMF to manage mobile connectivity control and policy.

5. The method of claim 4, wherein the on-premises telecommunications core comprises a packet data network (PDN) gateway (PGW).

6. A non-transitory computer readable medium comprising computer executable instructions embodied in the non-transitory computer readable medium that when executed by at least one processor of at least one computer cause the at least one computer to perform steps comprising:
at a mobile gateway implemented on one or more processors:
establishing, using an on-premises telecommunications network core of the mobile gateway, mobile data sessions for a plurality of mobile user devices and enabling communication between the mobile user devices through the on-premises telecommunications network core, wherein the on-premises telecommunications core comprises a 5G core comprising an access and mobility management function (AMF), a session management function (SMF), and a user plane function (UPF); and establishing, using a software-defined wide-area network (SD-WAN) controller, an SD-WAN overlay network for connecting the mobile user devices to an external telecommunications network;

wherein the mobile gateway comprises a session border controller (SBC), and wherein the SBC is configured for controlling telecommunications control plane signaling at an edge between an on-premises access network and a remote system comprising a centralized controller;

wherein the SD-WAN controller is configured for establishing a tunnel over a data communications network with a remote system comprising a services gateway, and wherein the mobile gateway is configured for exchanging controlling signaling with the remote system over the tunnel to establish the mobile data sessions;

wherein the mobile gateway is configured for providing quality of service (QoS) and route optimization for the mobile user devices using the SD-WAN overlay network, and wherein providing QoS and route optimization for the mobile user devices using the SD-WAN overlay network comprises prioritizing the mobile data sessions and re-routing the mobile data sessions over the SD-WAN overlay network to maintain QoS according to prioritizing the mobile data sessions; and wherein the SD-WAN controller is configured to collaborate with the SMF to manage mobile connectivity control and policy.

\* \* \* \* \*